US012762908B2

(12) United States Patent
Sheth et al.

(10) Patent No.: US 12,762,908 B2
(45) Date of Patent: Oct. 13, 2026

(54) SCALABLE SENSOR ANALYSIS FOR VEHICULAR DRIVING ASSISTANCE SYSTEM

(71) Applicant: Magna Electronics Inc., Auburn Hills, MI (US)

(72) Inventors: Sagar Sheth, Hösbach (DE); Florian Nübling, Sulzbach am Main (DE); Nico Schlucke, Sindelfingen (DE)

(73) Assignee: Magna Electronics Inc., Auburn Hills, MI (US)

( * ) Notice: Subject to any disclaimer, the term of this patent is extended or adjusted under 35 U.S.C. 154(b) by 533 days.

(21) Appl. No.: 18/173,829

(22) Filed: Feb. 24, 2023

(65) Prior Publication Data

US 2023/0274590 A1 Aug. 31, 2023

Related U.S. Application Data

(60) Provisional application No. 63/368,683, filed on Jul. 18, 2022, provisional application No. 63/268,518, filed on Feb. 25, 2022.

(51) Int. Cl.

| | |
|---|---|
| ***G07C 5/08*** | (2006.01) |
| ***B60W 50/04*** | (2006.01) |
| ***G06V 10/84*** | (2022.01) |
| ***G06V 20/56*** | (2022.01) |
| ***G06V 20/70*** | (2022.01) |

(52) U.S. Cl.

CPC ........... *G07C 5/0808* (2013.01); *G06V 10/84* (2022.01); *G06V 20/56* (2022.01); *G06V 20/70* (2022.01); *B60W 50/045* (2013.01)

(58) Field of Classification Search

CPC ...... G07C 5/0808; G06V 20/70; G06V 10/84; G06V 20/56; B60W 50/045

See application file for complete search history.

(56) References Cited

U.S. PATENT DOCUMENTS

| | | | |
|---|---|---|---|
| 5,550,677 | A | 8/1996 | Schofield et al. |
| 5,670,935 | A | 9/1997 | Schofield et al. |
| 5,949,331 | A | 9/1999 | Schofield et al. |
| 7,038,577 | B2 | 5/2006 | Pawlicki et al. |
| 7,720,580 | B2 | 5/2010 | Higgins-Luthman |
| 7,855,755 | B2 | 12/2010 | Weller et al. |
| 10,071,687 | B2 | 9/2018 | Ihlenburg et al. |
| 10,099,614 | B2 | 10/2018 | Diessner |
| 10,368,063 | B2 | 7/2019 | Lehmann et al. |
| 10,452,076 | B2 | 10/2019 | May et al. |

(Continued)

*Primary Examiner* — Steven Vu Nguyen

(74) *Attorney, Agent, or Firm* — HONIGMAN LLP

(57) ABSTRACT

A method for testing a vehicular driver assistance system includes recording sensor data from a sensor of a vehicle equipped with the vehicular driver assistance system and annotating the recorded sensor data. The annotations represent a predicted output of a processor when processing the recorded sensor data for the vehicular driver assistance system. The recorded sensor data and the annotated sensor data are stored at data storage. Analysis data is generated based on statistical analysis of the recorded sensor data and the statistical analysis of the annotated sensor data. The analysis data is stored at a results database. A key performance indicator (KPI) report is generated using the analysis data. The KPI report includes a dynamic graphic representation based on the analysis data.

15 Claims, 5 Drawing Sheets

(56) References Cited

U.S. PATENT DOCUMENTS

| | | | | |
|---|---|---|---|---|
| 11,643,104 | B2 | 5/2023 | Ustunel | |
| 2017/0124481 | A1* | 5/2017 | Crabtree | G06Q 10/0637 |
| 2018/0032605 | A1* | 2/2018 | Deshpande | G06F 16/3332 |
| 2018/0067488 | A1* | 3/2018 | Pollach | G06N 7/01 |
| 2019/0137294 | A1* | 5/2019 | Jung | G01C 21/3867 |
| 2022/0053171 | A1* | 2/2022 | Naphade | G08B 13/19673 |
| 2022/0135030 | A1 | 5/2022 | Varunjikar et al. | |
| 2023/0037228 | A1* | 2/2023 | Panigrahi | H04W 24/02 |
| 2024/0137473 | A1 | 4/2024 | Potnis et al. | |
| 2024/0151540 | A1 | 5/2024 | Püskül | |

* cited by examiner

SCALABLE SENSOR ANALYSIS FOR VEHICULAR DRIVING ASSISTANCE SYSTEM

CROSS REFERENCE TO RELATED APPLICATIONS

The present application claims the filing benefits of U.S. provisional application Ser. No. 63/368,683, filed Jul. 18, 2022, and U.S. provisional application Ser. No. 63/268,518, filed Feb. 25, 2022, which are hereby incorporated herein by reference in their entireties.

FIELD OF THE INVENTION

The present invention relates generally to a vehicle vision system for a vehicle and, more particularly, to testing a vehicle vision system that utilizes one or more cameras at a vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

A method for testing a vehicular driving assistance system includes recording sensor data from a sensor of a vehicle equipped with the vehicular driver assistance system. The method includes annotating the recorded sensor data. The annotations represent a predicted output of a processor when processing the recorded sensor data for the vehicular driver assistance system. The method includes storing the recorded sensor data and the annotated sensor data at data storage. The method includes generating analysis data based on statistical analysis of the recorded sensor data and statistical analysis of the annotated sensor data and storing the analysis data at a results database. The method also includes generating, using the stored analysis data, a key performance indicator (KPI) report. The KPI report includes a dynamic graphic representation based on the analysis data.

These and other objects, advantages, purposes and features of the present invention will become apparent upon review of the following specification in conjunction with the drawings.

DESCRIPTION OF THE PREFERRED EMBODIMENTS

A vehicle vision system and/or driver or driving assist system and/or object detection system and/or alert system operates to capture images interior or exterior of the vehicle and may process the captured image data to display images and to detect objects at or near or within the vehicle and in the predicted path of the vehicle, such as to assist a driver of the vehicle in maneuvering the vehicle in a forward or rearward direction or for driver monitoring systems (DMS) or occupant monitoring systems (OMS) or the like. The vision system includes an image processor or image processing system that is operable to receive image data from one or more cameras and provide an output to a display device for displaying images representative of the captured image data. Optionally, the vision system may provide display, such as a rearview display or a top down or bird's eye or surround view display or the like.

Figure 1:
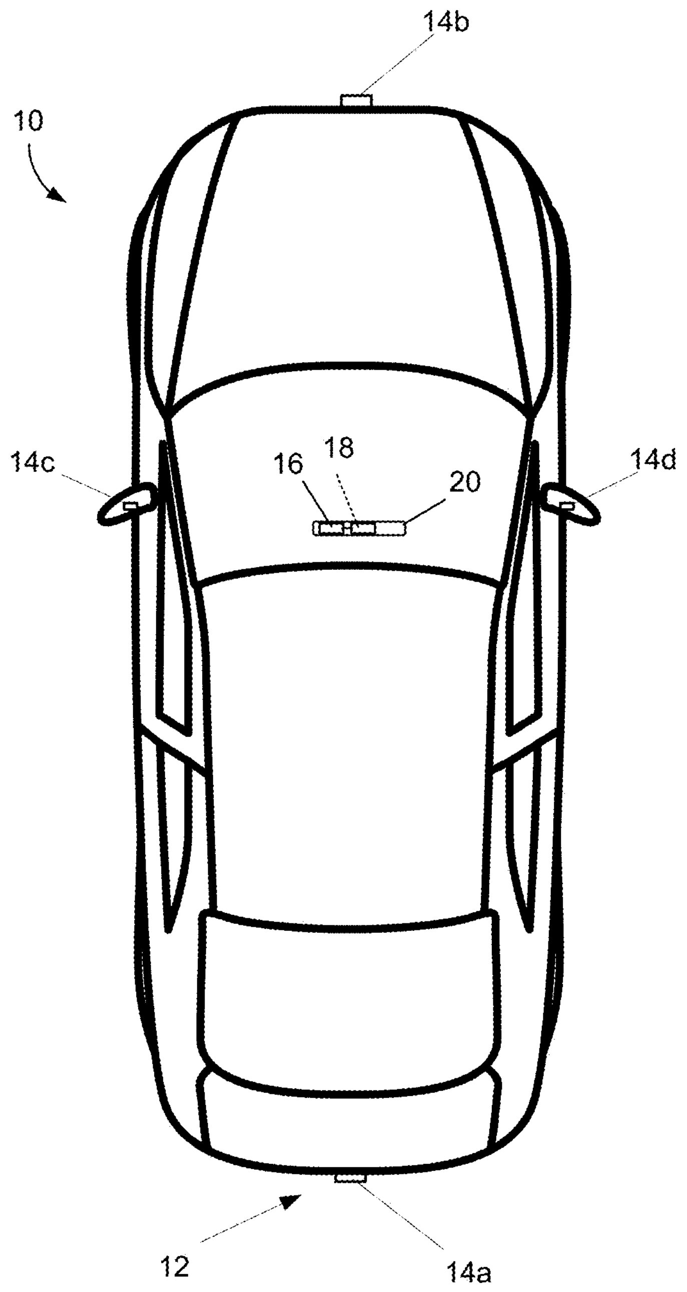
FIG. 1 is a plan view of a vehicle with a driving assistance system that incorporates cameras.

Referring now to the drawings and the illustrative embodiments depicted therein, a vehicle 10 includes an imaging system or vision system 12 that includes at least one exterior viewing imaging sensor or camera, such as a rearward viewing imaging sensor or camera **14*a* (and the system may optionally include multiple exterior viewing imaging sensors or cameras, such as a forward viewing camera 14*b* at the front (or at the windshield) of the vehicle, and a sideward/rearward viewing camera 14*c*, 14*d* at respective sides of the vehicle), which captures images exterior of the vehicle, with the camera having a lens for focusing images at or onto an imaging array or imaging plane or imager of the camera (FIG. 1). Optionally, a forward viewing camera may be disposed at the windshield of the vehicle and view through the windshield and forward of the vehicle, such as for a machine vision system (such as for traffic sign recognition, headlamp control, pedestrian detection, collision avoidance, lane marker detection and/or the like). Optionally, an interior viewing camera may be disposed within the cabin of the vehicle and view one or more occupants of the vehicle. The vision system 12 includes a control or electronic control unit (ECU) 18 having electronic circuitry and associated software, with the electronic circuitry including a data processor or image processor that is operable to process image data captured by the camera or cameras, whereby the ECU may detect or determine presence of objects or the like and/or the system provide displayed images at a display device 16 for viewing by the driver of the vehicle (although shown in FIG. 1 as being part of or incorporated in or at an interior rearview mirror assembly 20** of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Functional performance validation of advanced driver-assistance systems (ADAS) and/or automated driving (AD) systems (such as systems that use the camera(s) 14 including automatic emergency braking (AEB) systems, lane keeping systems, and adaptive cruise control systems) is a major contributor for evaluating and qualifying the developed technology, functionalities, and/or products, assuring compliance with regulatory bodies such as the New Car Assessment Program (NCAP), the National Highway Traffic Safety Administration (NHTSA), etc., and releasing the systems on public roads (e.g., during a development phase) and in production (e.g., for original equipment manufacturers (OEMs)).

Functional performance validation activities for ADAS/AD systems require world-wide data collection with target device under test (DUT) and reference sensorics, data processing, data management, ground truth generation/annotation and/or functional performance analysis using processed data and ground truth. Data analytics is one of the key aspects in performance validation of ADAS and/or AD functions. However, data analytics commonly demand state of the art technology, involve high amounts of manpower, and incur significant cost. For example, a significant portion of data analytics workflow occurs manually, which consumes significant time and money.

Figure 2:
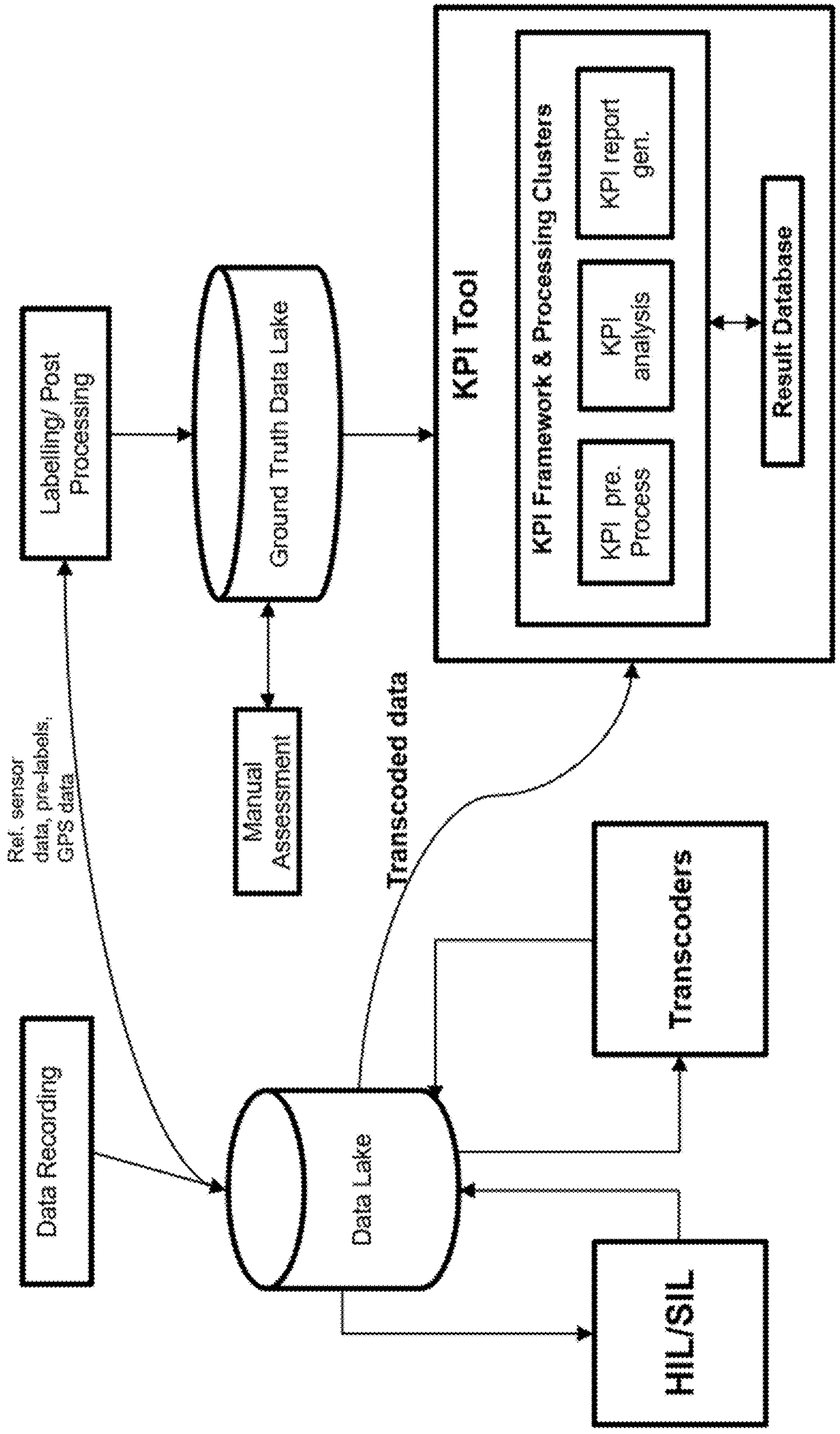
FIG. 2 is a schematic view of a system for generating key performance indicator (KPI) reports for testing the vehicular driving assistance system of FIG. 1.

To supply full automation, implementations herein include a key performance indicator (KPI) tool to provide a KPI execution Manager for continuous integration and development (CI/CD) of KPI scripts in a production environment. The architecture (FIG. 2) provides capability for high modularity in order to enable a complete workflow for anything from a single computer to full cloud infrastructure (i.e., cloud computing or other distributed computing systems). For example, sensor data may be recorded (e.g., from a vehicle equipped with one or more sensors such as cameras, radar sensors, lidar, etc.) and/or simulated (e.g., via a software-in-the-loop (SIL) or hardware-in-the-loop (HIL) methodology) and stored at a data lake (e.g., in the cloud on a distributed computing system, at on-premises storage facilities, etc.). The sensor data may be labeled (e.g., manually) to annotate the data. The annotations may provide the optimal or correct or desired outputs expected from one or more vehicular driver assistance systems. Optionally, the annotations may provide the correct or ideal prediction for a processor (e.g., executing a machine learning model) to make when processing recorded sensor data. That is, the annotations "inform" the processor/model of the correct prediction (e.g., the labels may be used to train one or more machine learning models of the system). For example, image data may be labeled with object classifications for various objects in the image data (e.g., vehicle, pedestrian, etc.). The labeled data may be stored at a ground truth data lake (such as at distributed storage/cloud storage or the like). The KPI tool may generate reports using the ground truth data and the sensor data.

Therefore, it is possible to analyze the annotated sensor data/ground truth data and/or transcoded DUT data for any amounts of data (e.g., from kilobytes to petabytes) representing any amount of vehicle data (e.g., from one driven kilometer to millions of kilometers).

Figure 3:
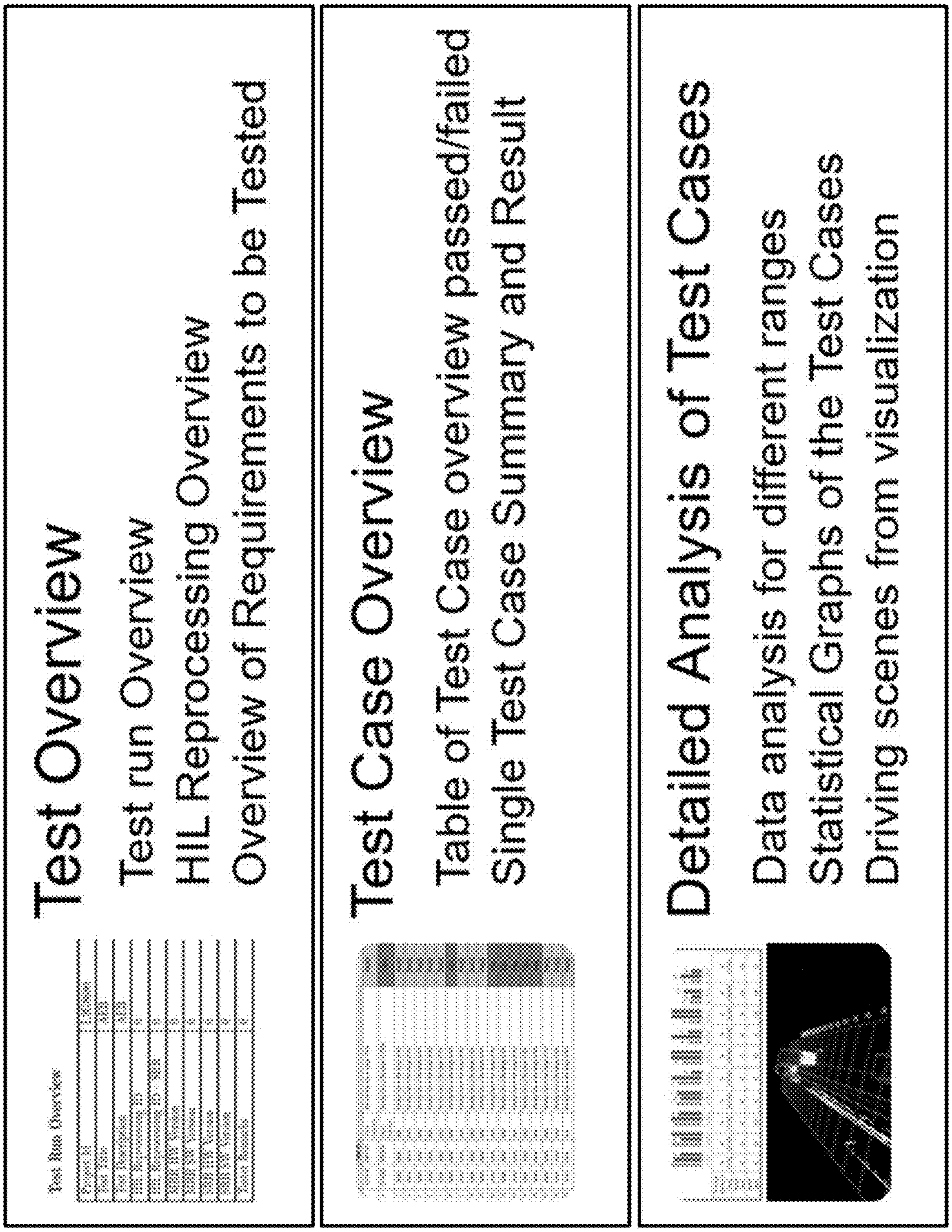
FIG. 3 is an exemplary KPI report generated by the system of FIG. 2.

The backend of the KPI tool may be suitable for handling big data storage and is compatible with distributed computing systems for KPI analysis and KPI report generation. Thus, due to its cloud infrastructure/integration, the KPI tool is highly scalable. The tool provides a platform to develop KPI libraries and tailored business logic for detailed analysis of ADAS signals in an automated process. Optionally, the tool automatically generates, as an output, a KPI report (FIG. 3), based on generic report libraries. The KPI Test Report, as illustrated here, may include one or more dynamic graphic representations, such as visualizations of driving scenes by, for example, modeling (based on the test data, such as image data, radar data, or the like) in two dimensions or three dimensions the test vehicle and one or more other objects relative to the test vehicle. The modeled objects may include other vehicles, pedestrians, road signs, traffic lanes, lane markers, etc. The reports may include test overviews, results of tests (e.g., pass/fail), data analysis, statistical graphs, etc.

Thus, the KPI tool provides a software platform for performing statistical analysis of "Big Data" for ADAS sensor signals using a highly scalable distributed computing system. The KPI tool includes a software platform for ADAS KPI tests on, for example, transcoded DUT data (e.g., labeled or annotated sensor data from sensors such as cameras, radar, LIDAR, etc.). For example, the DUT data includes a playlist of original and/or preprocessed recordings. The tool provides a scalable environment for KPI analysis and KPI report generation and a backend for big data storage and handling with a cloud service provider. The KPI tool may include an execution manager for continuous integration/continuous deliver (CI/CD) of KPI scripts in a production environment. The KPI tool may generate a report, including reports with dynamic graphical representations and may include report generation libraries. The KPI tool provides accelerated calculations due to, for example, the use of distributed computing via MapReduce (e.g., Elastic Map Reduce (EMR)) technology or techniques or models to adapt to "Big Data Input." The KPI tool provides the capability to provide a complete cloud workflow in local environment on local machine or cloud computing systems (e.g., virtual machines) for script development purposes. The KPI tool may provide a platform to develop KPI libraries for detailed analysis of ADAS signals in an automated process.

Figure 4:
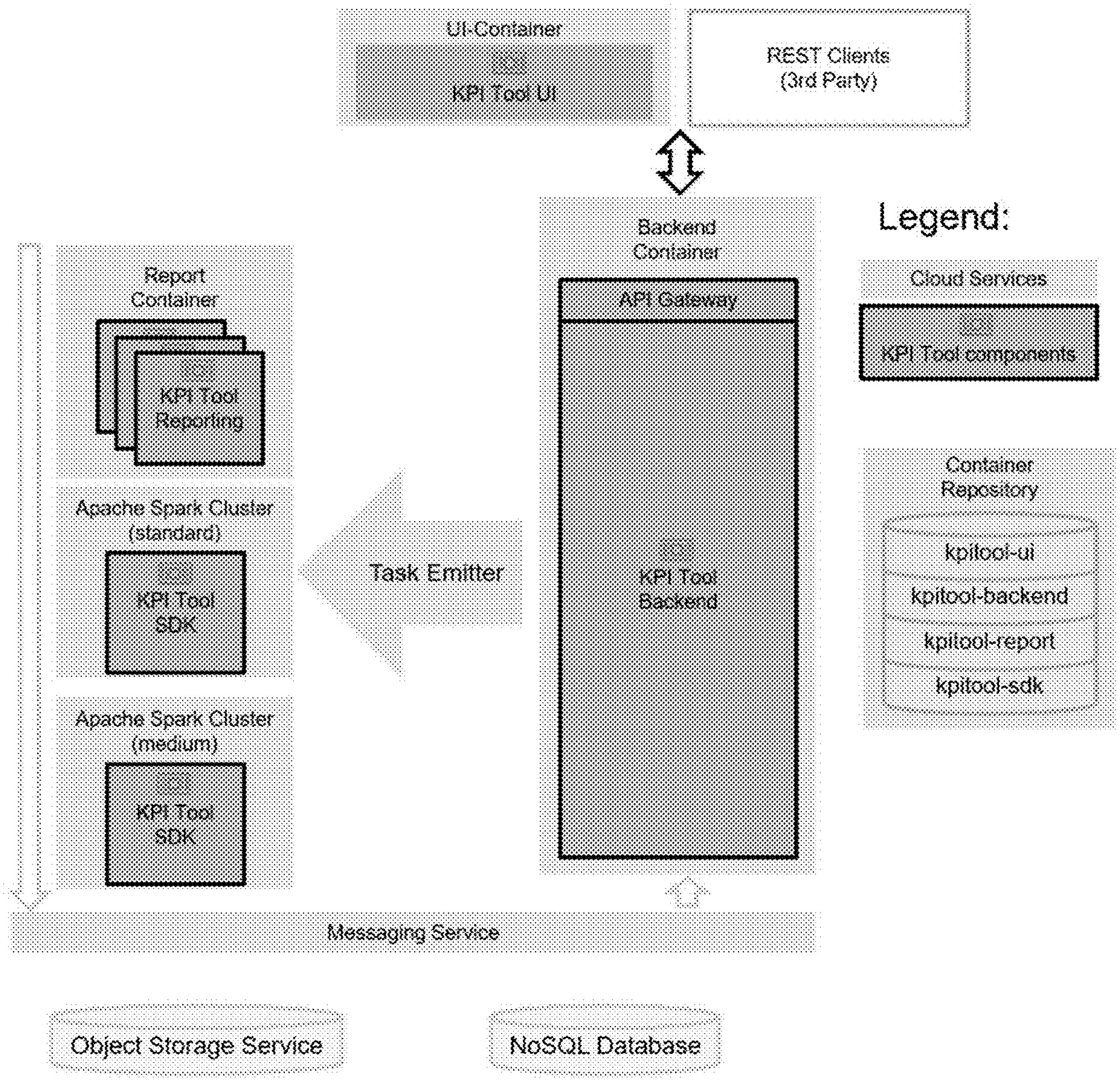
FIG. 4 is a block diagram of cloud implementations of the system of FIG. 2.

Referring now to FIG. 4, the different KPI tool components may be containerized and executed on different local or remote services (e.g., container cloud service applications). Through, for example, a KPI Tool user interface (UI) module, the user may access or interact with the tool and organize some or all of the data to be processed. To execute the data processing on an online cluster service, the KPI tool software development kit (SDK) may be accessible (e.g., as a Python library) and can be used with any analytics engine (e.g., for large-scale data processing). The KPI tool backend module may handle execution tasks and prepare all necessary parameters to be evaluated. After executing the ADAS data processing, the raw results may be stored and reconditioned to be accessible in, for example, LaTex (or other document preparation tools) format for the user in the KPI tool reporting module.

Figure 5:
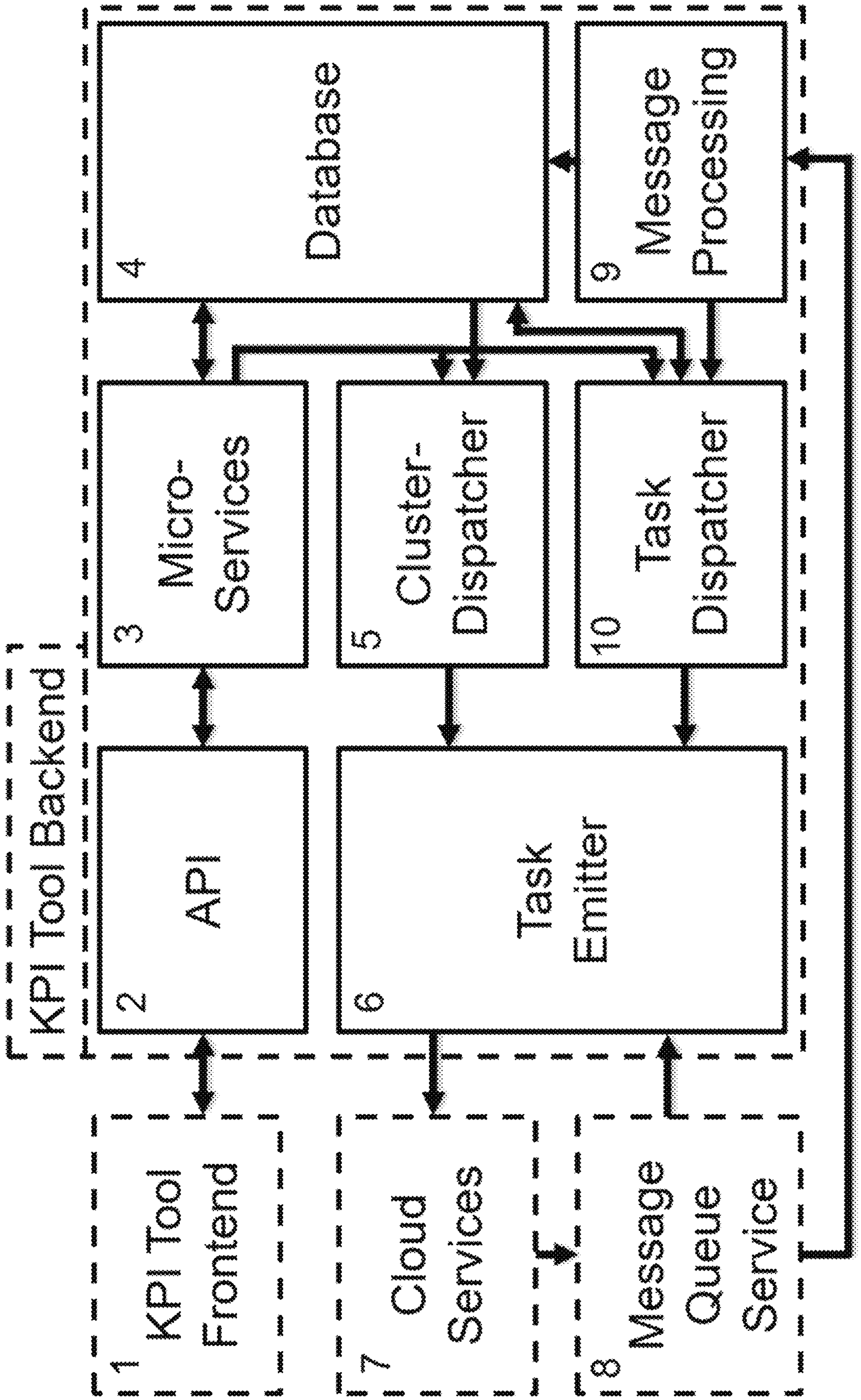
FIG. 5 is a block diagram of exemplary backend modules of the system of FIG. 2.

The KPI tool backend may comprise a microservice based web application that uses asynchronous or non-blocking web server architecture. In these examples, the KPI tool is optimized for high workload tasks and scalability. The KPI tool may implement state-of-the-art webserver architecture. The core-services may be accessible through, for example, a representational state transfer (i.e., RESTful) API-Service that provides third party access possibilities (FIG. 5). For example, the user may, via the KPI tool frontend (e.g., a graphical user interface executed in a user device, such as a mobile phone, a laptop, etc.), transfer various data or parameters (e.g., the labels) to the backend. The workload may be sent to the microservice component which prepares all necessary parameters to execute the requested task, stores them to a database, and creates an internal event which is depicted by the cluster dispatcher and/or the task dispatcher. The cluster dispatcher triggers the cluster cloud service and prepares the data analytics environment for execution. If all cloud services are ready to use, the task dispatcher may prepare the task data so that the KPI Tool SDK module may determine which parameters are to be evaluated. To check the status of the cloud services and of the running task, the cloud services and the backend may communicate via cloud-based messaging services which are processed and forwarded inside the KPI tool backend via the message processing module.

The KPI tool may use a document based (e.g., NoSQL) database system and may store the processed data on a cloud-based object storage services in, for example, in a JavaScript Object Notation (JSON) format. Because of a non-relational storage system, the KPI tool is highly customizable and may process different sensor data technologies. The KPI tool may use a scalable, highly durable, and fully managed database cloud service for operating mission-critical workloads.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in U.S. Pat. Nos. 10,099,614 and/or 10,071,687, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. The imaging array may comprise a CMOS imaging array having at least 300,000 photosensor elements or pixels, preferably at least 500,000 photosensor elements or pixels and more preferably at least one million photosensor elements or pixels, such as at least three million photosensor elements or pixels or at least five million photosensor elements or pixels, arranged in rows and columns. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 9,233,641; 9,146,898; 9,174,574; 9,090,234; 9,077,098; 8,818,042; 8,886,401; 9,077,962; 9,068,390; 9,140,789; 9,092,986; 9,205,776; 8,917,169; 8,694,224; 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or U.S. Publication Nos. US-2014-0340510; US-2014-0313339; US-2014-0347486; US-2014-0320658; US-2014-0336876; US-2014-0307095; US-2014-0327774; US-2014-0327772; US-2014-0320636; US-2014-0293057; US-2014-0309884; US-2014-0226012; US-2014-0293042; US-2014-0218535; US-2014-0218535; US-2014-0247354; US-2014-0247355; US-2014-0247352; US-2014-0232869; US-2014-0211009; US-2014-0160276; US-2014-0168437; US-2014-0168415; US-2014-0160291; US-2014-0152825; US-2014-0139676; US-2014-0138140; US-2014-0104426; US-2014-0098229; US-2014-0085472; US-2014-0067206; US-2014-0049646; US-2014-0052340; US-2014-0025240; US-2014-0028852; US-2014-005907; US-2013-0314503; US-2013-0298866; US-2013-0222593; US-2013-0300869; US-2013-0278769; US-2013-0258077; US-2013-0258077; US-2013-0242099; US-2013-0215271; US-2013-0141578 and/or US-2013-0002873, which are all hereby incorporated herein by reference in their entireties. The system may communicate with other communication systems via any suitable means, such as by utilizing aspects of the systems described in U.S. Pat. Nos. 10,071,687; 9,900,490; 9,126,525 and/or 9,036,026, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A method for testing a vehicular driver assistance system, the method comprising:

obtaining sensor data captured by a sensor of a vehicle equipped with the vehicular driver assistance system, the vehicular driver assistance system comprising a processor for processing captured sensor data;

obtaining annotations of the captured sensor data, the annotations representing a predicted output of the processor when the processor is processing the captured sensor data for the vehicular driver assistance system;

storing the captured sensor data and the annotated sensor data at data storage;

generating, using a MapReduce technique, analysis data based on statistical analysis of the captured sensor data and statistical analysis of the annotated sensor data;

storing the analysis data at a results database; and generating, using the stored analysis data, a key performance indicator (KPI) report comprising a test overview and a pass or fail result of the testing, wherein the KPI report comprises a dynamic graphic representation based on the analysis data, and wherein the dynamic graphic representation comprises a three-dimensional model of the equipped vehicle and at least one other object modeled relative to the equipped vehicle generated from the captured sensor data to visualize a driving scene.

2. The method of claim 1, wherein a distributed computing system performs the statistical analysis.

3. The method of claim 1, wherein the annotated sensor data and the results database are stored on distributed storage.

4. The method of claim 1, wherein the sensor comprises a camera, and wherein the captured sensor data comprises image data captured by the camera.

5. The method of claim 1, wherein the three-dimensional model of the at least one other object is located relative to the three-dimensional model of the equipped vehicle based on the captured sensor data.

6. The method of claim 1, wherein the at least one other object comprises at least one selected from the group consisting of (i) another vehicle, (ii) a pedestrian, and (iii) a lane marker.

7. The method of claim 1, wherein generating the analysis data comprises executing a data analytics engine within a cloud container.

8. The method of claim 1, further comprising receiving the annotations of the captured sensor data via a representational state transfer (REST) application programming interface (API).

9. The method of claim 1, wherein the results database comprises a document based database.

10. The method of claim 1, wherein the KPI report comprises, for each respective test case of a plurality of test cases, a result of the respective test case.

11. The method of claim 1, wherein the vehicular driver assistance system comprises one selected from the group consisting of (i) traffic sign recognition, (ii) headlamp control, (iii) pedestrian detection, (iv) collision avoidance, and (v) lane marker detection.

12. The method of claim 1, wherein the method further comprises training, using the annotated sensor data, a machine learning model of the vehicular driver assistance system.

13. A method for testing a vehicular driver assistance system, the method comprising:

obtaining image data captured by a forward-viewing camera disposed at a windshield of a vehicle equipped with the vehicular driver assistance system, the vehicular driver assistance system comprising an image processor for processing captured image data;

obtaining annotations of the captured image data, the annotations representing a predicted output of the image processor when processing the captured image data for the vehicular driver assistance system;

storing the captured image data and the annotated image data at data storage;

generating, using a MapReduce technique, analysis data based on statistical analysis of the captured image data and statistical analysis of the annotated image data;

storing the analysis data at a results database; and generating, using the stored analysis data, a key performance indicator (KPI) report comprising a test overview and a pass or fail result of the testing, wherein the KPI report comprises a dynamic graphic representation based on the analysis data, and wherein the dynamic graphic representation comprises a three-dimensional model of the equipped vehicle and at least one other object modeled relative to the equipped vehicle generated from the captured image data to visualize a driving scene.

14. The method of claim 13, wherein the model of the at least one other object is located relative to the model of the equipped vehicle based on the captured image data.

15. The method of claim 13, wherein the at least one other object comprises at least one selected from the group consisting of (i) another vehicle, (ii) a pedestrian, and (iii) a lane marker.

* * * * *